United States Patent [19]

Mouton

[11] Patent Number: 5,265,414
[45] Date of Patent: Nov. 30, 1993

[54] ANTI-FLAMEOUT SAFETY SYSTEM FOR A GAS TURBINE ENGINE

[75] Inventor: Pierre C. Mouton, Grigny, France

[73] Assignee: Societe Nationale d'Etude et de Construction de Moteurs d'Aviation (S.N.E.C.M.A.), Paris, France

[21] Appl. No.: 943,693

[22] Filed: Sep. 11, 1992

[30] Foreign Application Priority Data

Sep. 18, 1991 [FR] France .................. 91 11473

[51] Int. Cl.$^5$ .............................................. F02C 9/28
[52] U.S. Cl. .............................. 60/39.091; 60/39.281
[58] Field of Search ............ 60/39.03, 39.091, 39.24, 60/39.281

[56] References Cited

U.S. PATENT DOCUMENTS

| | | | |
|---|---|---|---|
| 3,747,340 | 7/1973 | Fenton et al. | 60/228.1 |
| 3,805,517 | 4/1974 | Sewell et al. | 60/39.091 |
| 3,830,055 | 8/1974 | Enlund | 60/39.091 |
| 4,380,894 | 4/1983 | Abo et al. | 60/39.281 |

FOREIGN PATENT DOCUMENTS 0025406 3/1981 European Pat. Off. .

Primary Examiner—Louis J. Casaregola
Attorney, Agent, or Firm—Bacon & Thomas

[57] ABSTRACT

An anti-flameout safety system for a gas turbine engine is disclosed which prevents engine flameout in the event of ingestion of hail and/or water through the engine intake. The anti-flameout safety system has a detector to detect the water concentration in the engine which generates a signal when the water concentration is at or above a predetermined level and an engine control means which is associated with the detector such that, when the detector generates the signal, the engine control means automatically increases the engine power output.

13 Claims, 3 Drawing Sheets

ANTI-FLAMEOUT SAFETY SYSTEM FOR A GAS TURBINE ENGINE

BACKGROUND OF THE INVENTION

The present invention is directed toward an anti-flameout safety system for a gas turbine engine, particularly such a safety system which prevents engine flameout in the event of entry of hail or water through the engine intake.

Typical gas turbine engines comprise at least one upstream axial compressor which compresses the air taken in through the engine intake and supplies the compressed air to a combustion chamber to be mixed with suitable fuel and burned. Such axial compressors typically have front air intakes for the air flow required for good gas turbine engine operation. However, when operated in adverse atmospheric conditions, the gas turbine engines also may take in significant quantities of hail and/or water such as, for instance, when the aircraft on which the engine is mounted passes through storms or clouds. The hail and/or water taken into the gas turbine engine may cause malfunctioning of the engine.

If the gas turbine engine is operating at full power, the compressor raises the temperature of the air passing through it so that any water contained in the air is vaporized. Thus, under these operating conditions, the hail and/or water does not cause extinction of the flame in the combustion chamber, known as flameout.

When the aircraft is operating under low engine power conditions, such as, for instance, during a landing approach, the compression ratio of the compressor is small. In this instance, the increase in temperature of the compressed air as it passes through the compressor may be insufficient to vaporize water present in the air so that water may arrive, either in a liquid state or in the form of ice particles, at the combustion chamber and cause flameout of one or more burners, and possibly even of the entire combustion chamber, thereby causing engine flameout. Quite obviously, engine flameout has serious consequences during all aircraft operating conditions, especially during a landing approach.

The prior art has attempted to solve the problem of hail or water in the intake gases by placing mechanical obstacles in the path of the air. These devices have included centrifugal separators, scoops, or nose cowls which force the hail or water particles to undergo deflection such that they may be removed from the intake air. However, such devices have proven to be unduly complex and have fallen short of achieving their objectives.

Another solution has been to have the aircraft pilot manually operate the throttles to increase engine power when the aircraft passes through heavy rains or storms which may cause engine malfunction due to the high concentrations of water in the intake air. Such a solution has not proven to be effective, since it requires the manual intervention of the aircraft pilot.

SUMMARY OF THE INVENTION

An anti-flameout safety system for a gas turbine engine is disclosed which prevents engine flameout in the event of ingestion of hail and/or water through the engine intake. The anti-flameout safety system has a detector to detect the water concentration in the engine which generates a signal when the water concentration is at or above a predetermined level and an engine control means which is associated with the detector such that, when the detector generates the signal, the engine control means automatically increases the engine power output.

The present anti-flameout safety system is an automatic system which does not require aircraft pilot intervention and one which utilizes data from existing aircraft and engine sensors. The circuitry of the electronics involved in the anti-flameout safety system is simple and economical so as to provide a low cost, automatic, reliable system to prevent engine flameout.

DETAILED DESCRIPTION OF THE PREFERRED EMBODIMENT

Figure 1:
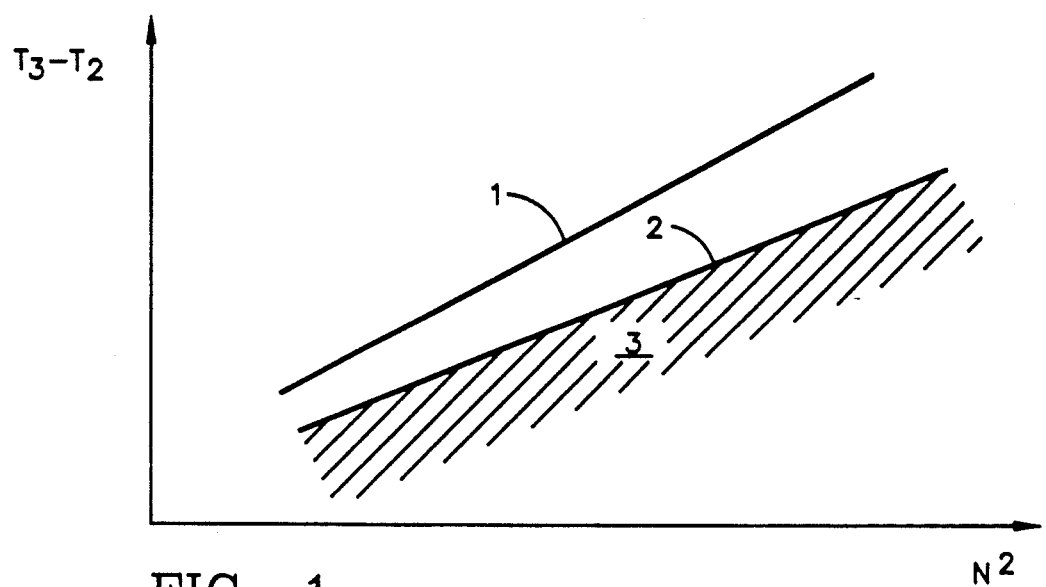
FIG. 1 is a graph showing the temperature rise in a gas turbine engine compressor versus the rotational engine speed when the air is dry (10 and where it is water saturated (2).

The anti-flameout safety system according to the present invention comprises a first detector means for detecting the critical water concentration of the air in the engine based on the fact that the compressor raises the temperature of the air passing through it as shown by the characteristic curves 1 and 2 in FIG. 1. These curves represent the temperature difference $\Delta T$ between the compressor outlet temperature $T_3$ and the intake temperature $T_2$ as a function of the rotational speed N of the compressor. Curve 1 denotes these conditions when the intake air is dry, while curve 2 denotes the $\Delta T$ when the air contains a critical concentration of water.

The temperature difference $\Delta T$ also depends upon the relative humidity of the air taken in by the compressor. When the compressor compresses water laden air, the compressor partially or totally evaporates the water in the intake air with a $\Delta T$ less than if the air were dry. Thus, by measuring the $\Delta T$, the water concentration in the air passing through the compressor can be determined. The anti-flameout safety system according to the present invention has a first detector based on measuring the compressor intake air temperature $T_2$ and the compressor outlet air temperature $T_3$ and computes $\Delta T$ which equals $T_3 - T_2$. The acceptable $\Delta T$ will increase as the rotational speed of the engine increases, thus the determined operating point $T_3 - T_2 = f(N^2)$. The critical value of the temperature difference, $\Delta T_c$, constitutes the minimum $\Delta T$ that will permit normal engine operation at a given rotational speed N.

The curves 1 and 2 of FIG. 1 are characteristic of each particular gas turbine engine and are empirically determined. Curve 2 determines the maximum water concentration at which the engine will function normally. If the measured operating point, based on $\Delta T = f(N^2)$, falls below curve 2, in the shaded area 3 of FIG. 1, the measured water concentration will be such that it will effect normal engine operation. In this instance, the detector transmits a signal to an engine control means which raises the engine power which, in turn, increases the rotational speed N and thereby increases the ΔT.

A second detector may be operatively interposed between the first detector and the engine control means to provide an extra measure of data input to the anti-flameout safety system. The second detector senses the critical water concentration independently of the first detector and provides confirmation of the information provided by the first detector.

The second detector is based upon the fact that beyond a critical water concentration, water which is not vaporized by the compressor will enter the combustion chamber, thereby decreasing the combustion efficiency of the engine. The combustion efficiency is lowered since part of its energy must be provided to vaporize the water. Thus, the second detector measures the combustion efficiency, for instance, by monitoring the relationship:

$$T_{49} - T_3 = f(Wf/P_3 - kN^2)$$

where:
$T_{49}$ = temperature at turbine outlet;
$T_3$ = temperature at combustion chamber inlet (also at the compressor outlet);
Wf = the flow of fuel by weight;
$P_3$ = compressor outlet pressure;
N = rotational speed of the turbine and compressor;
k = constant.

Figure 2:
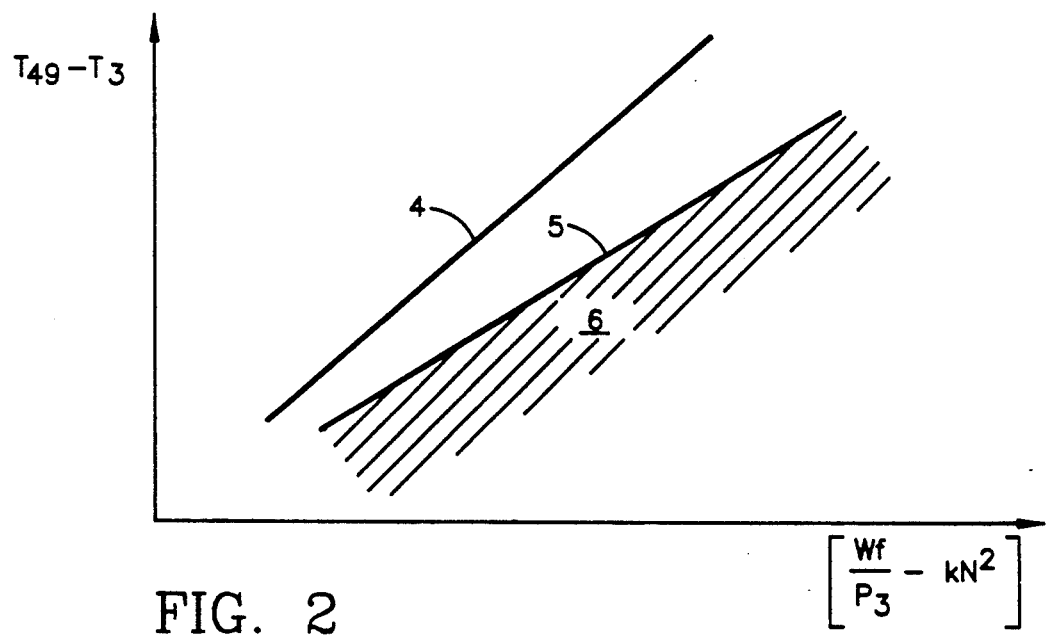
FIG. 2 is a graph similar to FIG. 1 showing the combustion efficiency when the air is dry (4) and when the air is saturated with water (5).

FIG. 2 illustrates this relationship when the gas turbine engine intake air is dry, by curve 4, and when the intake air contains a critical concentration of water, curve 5. Once the operational parameters Wf, $P_3$, N, $T_{49}$ and $T_3$ have been measured the values of $(Wf/P_3 - kN^2)$ and $(T_{49} - T_3)$ are then calculated to determine the operational point of the engine. This operational point is compared with the critical value $(T_{49} - T_3)c$ corresponding to the measured value $(Wf/P_3 - kN^2)$. If the calculated operational point lies in the shaded area 6, the second detector confirms the signal from the first detector and the engine control means increases the engine power. As can be seen, the second detector provides a redundant, back-up to the first detector to increase the reliability of the system and to prevent erroneous signals from increasing the engine speed.

Figure 3:
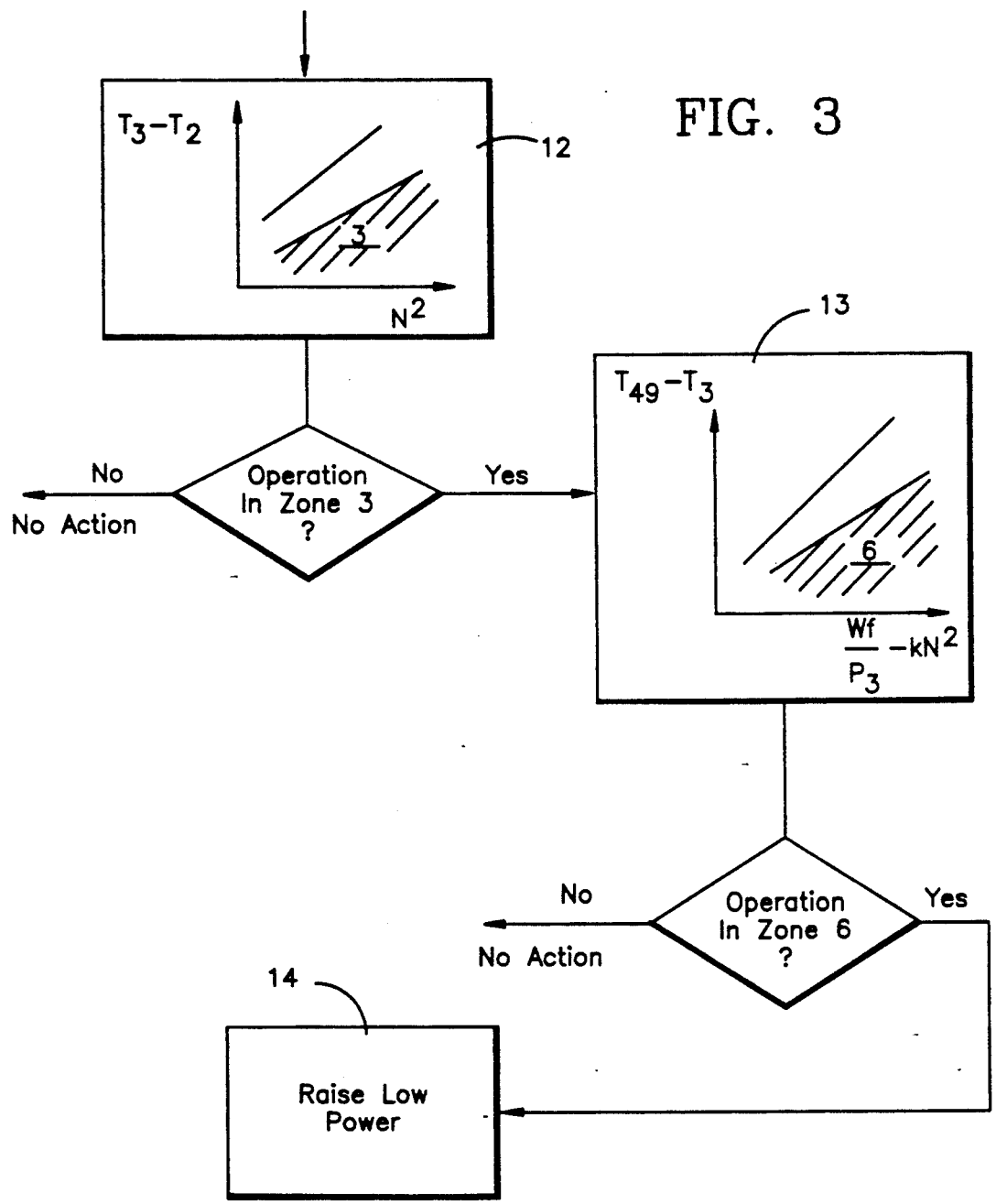
FIG. 3 is a logic diagram of the anti-flameout system according to the present invention.
Figure 4:
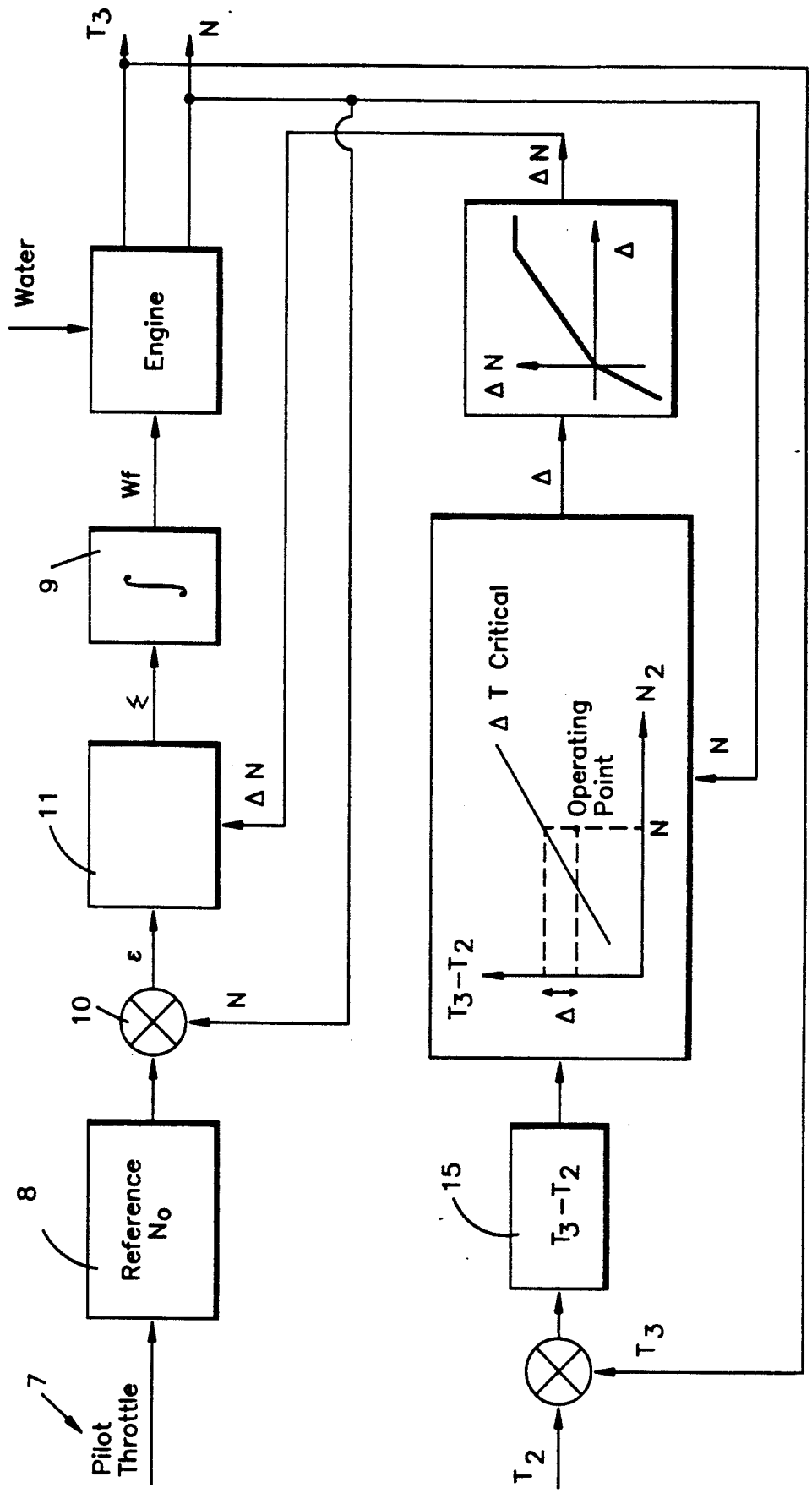
FIG. 4 is a schematic diagram of the anti-flameout system according to the present invention.

A logic diagram for the anti-flameout safety system according to the present invention is illustrated in FIG. 3 and comprises the first detector 12, the second detector 13 and the engine control means 14. A more detailed schematic diagram of the system is illustrated in FIG. 4. As can be seen in that figure, a signal 8 of a reference rotational engine speed $N_0$ is determined by the position of the throttle 7, operated by the pilot. The engine computer provides the required information to the fuel metering valve 9 to deliver a fuel flow Wf to match the desired engine operation. The actual rotational speed N is measured and compared with the reference speed $N_0$ by a comparator 10 to determine the difference ε between the two speeds (N and $N_0$) and to correct the fuel flow Wf in order to achieve an actual engine speed N equal to the reference speed $N_0$ and thereby to provide regulation of the fuel flow.

The temperatures $T_3$ at the compressor outlet and $T_2$ at its intake, as well as the engine speed N are measured and provide the input data for the antiflameout safety system according to the present invention. Computer 15 calculates ΔT which is the difference $T_3 - T_2$ and compares the operating point $\Delta T = T_3 - T_2 = f(N^2)$ with the critical operating point $\Delta T_c$ corresponding to the measured speed N. When ΔT is less than $\Delta T_c$ for the measured engine speed N, the computer calculates a Δ corresponding to the difference between the measured ΔT and $\Delta T_c$ and then relates this value of Δ to a ΔN which represents the required speed increment of the engine to arrive at $\Delta T_c$.

This ΔN is compared with ε by a known maximum preponderance circuit 11, which is also called "highest win", which, in turn, provides the data of the largest value among ε and ΔN to the fuel metering valve 9 to correspondingly increase the fuel flow Wf to increase the engine speed N.

The safety system according to the present invention may also include a second detector for detecting the critical water concentration by using the combustion chamber efficiency. In this instance, the second detector operates as a double check to the signal generated by the first detector and eliminates false alarms from any malfunctions of the first detector.

The present invention offers the advantages of using parameters already detected by engine and aircraft sensors and which are used for other control purposes of the gas turbine engine, in particular the FADEC electronic control. In order to implement the invention, appropriate preliminary tests will define the critical limits which are characteristic of each engine and the actual engine operation will be compared to these critical limits.

Known means for preventing engine hunting and stalling may also be incorporated into the anti-flameout safety system according to the present invention.

The foregoing description is provided for illustrative purposes only and should not be construed as in any way limiting this invention, the scope of which is defined solely by the appended claims.

I claim:

1. An anti-flameout safety system for a gas turbine engine to prevent engine flameout in the event of entry of hail or water through the engine intake wherein the gas turbine engine has a compressor with an intake and an outlet, comprising:
   a) a first detector to detect the water concentration in the compressor of the engine, the first detector generating a signal when the water concentration is at or above a predetermined level wherein the first detector comprises:
      i) a first temperature measurement device to measure the temperature $T_3$ of the gases at the compressor outlet;
      ii) a second temperature measurement device to measure the temperature $T_2$ of the gases at the compressor intake;
      iii) a speed measuring device to measure the engine rotational speed N;
      iv) a calculating device operatively connected to the first and second temperature measurement devices and the speed measuring device to calculate an operating point based on the temperature difference $(T_3 - T_2)$ as a function of the rotational speed N; and,
      v) a comparator operatively associated with the calculating device to compare the calculated operating point with a predetermined critical operating point for a given engine speed N; and,
   b) an engine controller operatively associated with the gas turbine engine and the first detector to automatically raise the engine power output when the first detector generates the signal.

2. The anti-flameout safety system of claim 1 further comprising: a second detector operatively interposed between the first detector and the engine controller so as to detect water concentration independently of the first detector when receiving the signal generated by the first detector and to generate a signal to the engine controller if the water concentration is at or above a predetermined value.

3. The anti-flameout safety system of claim 2 wherein the second detector determines the combustion efficiency of the gas turbine engine.

4. The anti-flameout system of claim 3 wherein the second detector comprises:
   a) a third temperature measurement device to measure the temperature $T_{49}$ of the gases at a turbine outlet of the gas turbine engine;
   b) a fuel flow measurement device to measure the fuel flow (Wf) by weight; and,
   c) a pressure measurement device to measure the pressure $P_3$ of gases at the compressor outlet of the gas turbine engine;
   wherein the calculating device is operatively connected to the first and third temperature measurement devices, the fuel flow measurement device, the pressure measurement device and the speed measuring device to calculate an operating point based on the temperature difference $(T_{49}-T_3)$ as a function of $(Wf/P_3)-kN^2$ where k is a constant the calculating device operatively connected to the comparator to compare the calculated operating point with a predetermined critical operating point.

5. The anti-flameout safety system of claim 2 wherein the first detector generates a signal to the second detector corresponding to a rotational speed increase of the gas turbine engine.

6. The anti-flameout safety system of claim 5 wherein the gas turbine engine includes a throttle and further comprising a throttle sensor operatively connected to the to generate a signal to the second detector corresponding to the rotational speed of the gas turbine engine as a function of throttle position.

7. The anti-flameout safety system of claim 6 having a maximum preponderance circuit and a fuel metering valve for the gas turbine engine wherein the comparator operatively connects the maximum preponderance circuit the fuel metering valve, the first detector and the throttle sensor so as to compare the signals received from the first detector and the throttle sensor so as to control the fuel metering valve to increase engine power based upon the larger of the two signals.

8. An anti-flameout safety system for a gas turbine engine to prevent engine flameout in the event of entry of hail or water through the engine intake, comprising:
   a) a first detector to detect the water concentration in the engine, the first detector generating a signal when the water concentration is at or above a predetermined level;
   b) an engine controller operatively associated with the gas turbine engine and the first detector to automatically raise the engine power output when the first detector generates the signal; and,
   c) a second detector operatively interposed between the first detector and the engine controller so as to detect water concentration independently of the first detector when receiving the signal generated by the first detector means and to generate a signal to the engine controller if the water concentration is at or above a predetermined value.

9. The anti-flameout safety system of claim 8 wherein the second detector determines the combustion efficiency of the gas turbine engine.

10. The anti-flameout safety system of claim 9 wherein the second detector comprises:
    a) a temperature measurement device to measure the temperature $T_3$ of the gases at a compressor outlet of the gas turbine engine;
    b) a temperature measurement device to measure the temperature $T_{49}$ of the gases at a turbine outlet of the gas turbine engine;
    c) a fuel flow measurement device to measure the fuel flow (Wf) by weight;
    d) a pressure measurement device to measure the pressure $P_3$ of gases at a compressor outlet of the gas turbine engine;
    e) a speed measuring device to measure the rotational speed N of the gas turbine engine;
    f) a calculator operatively associated with the first and third temperature measuring devices, the fuel flow measurement device, the pressure measurement device and the speed measuring device to calculate an operating point based on the temperature difference $(T_{49}-T_3)$ as a function of $(Wf/P_3)-kN^2$ where k is a constant; and,
    g) a comparator operatively associated with the calculator to compare the calculated operating point with a predetermined critical operating point.

11. The anti-flameout safety system of claim 8 wherein the first detector generates a signal to the second detector corresponding to a rotational speed increase of the gas turbine engine.

12. The anti-flameout safety system of claim 11 wherein the gas turbine engine includes a throttle and further comprising a throttle sensor operatively associated with the throttle to generate a signal to the second detector corresponding to the rotational speed of the gas turbine engine as a function of throttle position.

13. The anti-flameout safety system of claim 12 having a maximum preponderance circuit and a fuel metering valve for the gas turbine engine wherein the comparator operatively connects the maximum preponderance circuit, the fuel metering valve, the first detector and the throttle sensor so as to compare the signals received from the first detector and the throttle sensor and controls the fuel metering valve to increase engine power based upon the larger of the two signals.

* * * * *